US009846572B2

(12) United States Patent
Scoda

(10) Patent No.: US 9,846,572 B2
(45) Date of Patent: Dec. 19, 2017

(54) METHODS FOR FACILITATING REFERENCES IN A CHAT CONTEXT AND DEVICES THEREOF

(71) Applicant: Usablenet Inc., New York, NY (US)

(72) Inventor: Enrico Scoda, Martignacco (IT)

(73) Assignee: UsableNet Inc., New York, NY (US)

( * ) Notice: Subject to any disclaimer, the term of this patent is extended or adjusted under 35 U.S.C. 154(b) by 346 days.

(21) Appl. No.: 14/509,235

(22) Filed: Oct. 8, 2014

(65) Prior Publication Data

US 2016/0104223 A1  Apr. 14, 2016

(51) Int. Cl.
| G06Q 30/00 | (2012.01) |
| G06F 17/30 | (2006.01) |
| G06F 9/45 | (2006.01) |
| G06Q 30/06 | (2012.01) |
| H04L 12/58 | (2006.01) |

(52) U.S. Cl.
CPC ......... *G06F 8/425* (2013.01); *G06Q 30/0613* (2013.01); *G06Q 30/0623* (2013.01); *G06Q 30/0631* (2013.01); *H04L 51/02* (2013.01); *H04L 51/046* (2013.01); *H04L 51/08* (2013.01); *H04L 51/18* (2013.01)

(58) Field of Classification Search
None
See application file for complete search history.

(56) References Cited

U.S. PATENT DOCUMENTS

| 6,678,673 B1 * | 1/2004 | Eves ............... G06F 17/30699 |
| 6,804,664 B1 * | 10/2004 | Hartman ......... G06F 17/30324 |
| 2010/0169361 A1 * | 7/2010 | Chen ............... G06F 17/30598 707/769 |
| 2013/0311339 A1 | 11/2013 | Jeremias |
| 2014/0317517 A1 * | 10/2014 | Aoki ............... G06F 17/30887 715/738 |

OTHER PUBLICATIONS

Kindberg T, Implementing Physical Hyperlinks Using Ubiquitous Identifier Resolution, Mar. 12, 2002, HP Laboratories Palo Alto, 11th International World Wide Web Conference.*
International Preliminary Report on Patentability for PCT Application No. PCT/US2015/036956, Apr. 11, 2017, pp. 1-9.

\* cited by examiner

*Primary Examiner* — Michael Misiaszek
*Assistant Examiner* — Matthew Todd
(74) *Attorney, Agent, or Firm* — LeClairRyan, a Professional Corporation

(57) ABSTRACT

A method, non-transitory computer readable medium, and chat management server apparatus that receives a search request via a search panel provided in response to a user interaction with a chat panel. A token including a special character is generated based on search text in the search request or a unique identifier for one of a plurality of items identified based on a search performed using the search text. The token is provided to a source of the search request for inclusion in the chat panel as a hyperlink. A preview panel request including the token is received in response to a user interaction with the hyperlink. Content for the items or for the one item is retrieved based on the special character included in the token. The content is provided to a source of the preview panel request.

21 Claims, 7 Drawing Sheets

METHODS FOR FACILITATING REFERENCES IN A CHAT CONTEXT AND DEVICES THEREOF

FIELD

This technology generally relates to web-based chat contexts and, more particularly, to methods, non-transitory computer readable media, and apparatuses that facilitate the inclusion of references in chat panels.

BACKGROUND

Increasingly, web developers are providing chat functionality in websites via chat contexts that include chat panels that are displayed to a user as embedded within a web page or via a pop-up window, for example. A chat panel can allow interaction and communication between the user and a representative of the website host. Accordingly, such functionality is particularly useful for websites providing user support, although many other types of websites also implement chat contexts. In chat contexts, the speed of an exchange is often critical to an effective experience for users and, accordingly, it is preferable that messages are simple and short.

As one example, in a commercial website context, sales representatives may use chat panels to communicate with potential customers to answer questions regarding products or services in order to facilitate and increase sales. In this example, a sales representative may want to refer a prospective customer to content hosted on other portions of the website, such as product catalog content relating to products that might satisfy desired criteria communicated by the prospective customer.

In order to refer the prospective customer to the content, the sales representative may copy and paste Uniform Resource Locators (URLs) as hyperlinks. However, URLs are often very long and inconvenient for use in a chat context. While available services can process a URL and replace the URL with a relatively short link, the process is cumbersome and would still result in numerous hyperlinks and a relatively long message when the content is located at a number of URLs (e.g., corresponding to a number of different products). Additionally, upon selecting any of the hyperlinks, the prospective customer may be taken to a different web page in a new tab or window, which is inconvenient and does not allow the customer to preview products prior to navigating to a different web page associated with one of the products. Accordingly, there is currently no way for the representative of a website host to identify items and provide preview content associated with the items to the prospective customer in an efficient and effective manner in a chat context.

SUMMARY

A method for facilitating references in a chat context includes receiving by a chat management server apparatus a search request via a search panel provided in response to a user interaction with a chat panel. A token including a special character is generated by the chat management server apparatus based on search text in the search request or a unique identifier for one of a plurality of items identified based on a search performed using the search text. The token is provided by the chat management server apparatus to a source of the search request for inclusion in the chat panel as a hyperlink. A preview panel request including the token is received by the chat management server apparatus in response to a user interaction with the hyperlink. Content for the items or for the one item is retrieved by the chat management server apparatus based on the special character included in the token. The content is provided by the chat management server apparatus to a source of the preview panel request.

A non-transitory computer readable medium having stored thereon instructions for facilitating references in a chat context comprising executable code which when executed by a processor, causes the processor to perform steps including receiving a search request via a search panel provided in response to a user interaction with a chat panel. A token including a special character is generated based on search text in the search request or a unique identifier for one of a plurality of items identified based on a search performed using the search text. The token is provided to a source of the search request for inclusion in the chat panel as a hyperlink. A preview panel request including the token is received in response to a user interaction with the hyperlink. Content for the items or for the one item is retrieved based on the special character included in the token. The content is provided to a source of the preview panel request.

A chat management server apparatus including a processor and a memory coupled to the processor which is configured to be capable of executing programmed instructions comprising and stored in the memory to receive a search request via a search panel provided in response to a user interaction with a chat panel. A token including a special character is generated based on search text in the search request or a unique identifier for one of a plurality of items identified based on a search performed using the search text. The token is provided to a source of the search request for inclusion in the chat panel as a hyperlink. A preview panel request including the token is received in response to a user interaction with the hyperlink. Content for the items or for the one item is retrieved based on the special character included in the token. The content is provided to a source of the preview panel request.

This technology provides a number of advantages including methods, non-transitory computer readable media, and apparatuses that more effectively facilitate references in a chat context. With this technology, website host representatives can identify content responsive to a search request from a user and communicate a reference to the content using a relatively short token. The token includes a special character and is introduced to a chat panel as a hyperlink. Upon selection of the hyperlink, the content is retrieved based on the token and included special character, and a preview panel is display to the user that includes the content.

Accordingly, using the tokens, the size of the communicated reference(s) can be reduced, particularly when multiple URLs would otherwise have been required to communicate references to content associated with multiple items responsive to a search request. Additionally, the user does not have to navigate away from the current web page to see the content. Moreover, the tokens can be reused, advantageously allowing the host representative to respond relatively quickly to certain search requests matching previously searched criteria.

DETAILED DESCRIPTION

Figure 1:
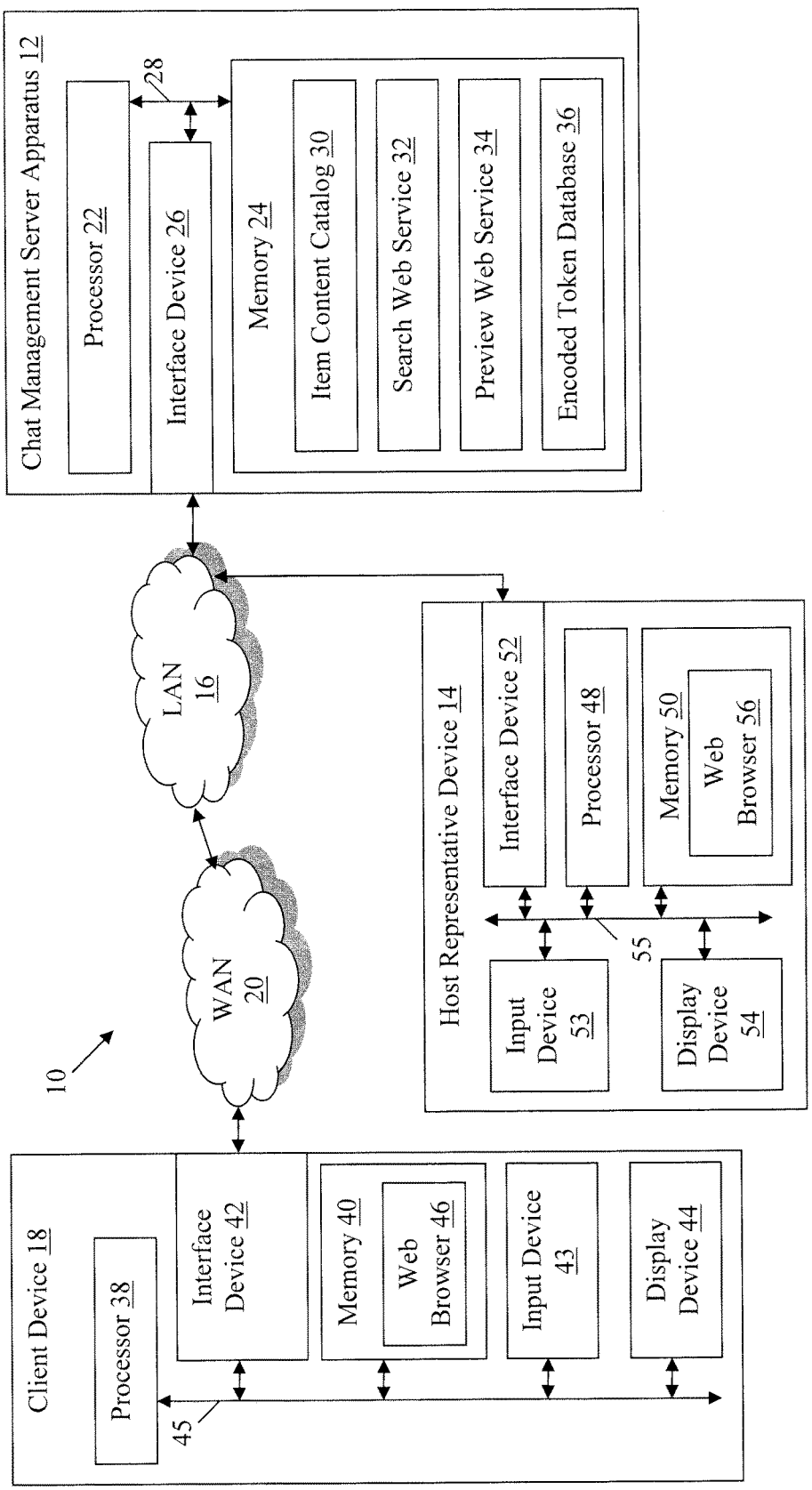
FIG. 1 is a block diagram of a network environment which incorporates an exemplary chat management server apparatus.

An exemplary network environment 10 is illustrated in FIG. 1 as including an exemplary chat management server apparatus 12. In this example, the chat management server apparatus 12 is coupled to a host representative device 14 by a local area network (LAN) 16 and a client device 18 by the LAN 16 and a wide area network (WAN) 20, although other types and numbers of devices, components, and elements in other topologies could be used. This technology provides a number of advantages including methods, non-transitory computer readable media, and apparatuses that more efficiently and effectively facilitate identifying and providing references to content matching user search criteria in a chat context.

In this example, the chat management server apparatus 12 includes a processor 22, a memory 24, and an interface device 26, which are coupled together by a bus 28 or other communication link, although other numbers and types of components, parts, devices, systems, and elements in other configurations and locations can be used. The processor 22 of the chat management server apparatus 12 may execute one or more stored programmed instructions for one or more aspects of this technology as described and illustrated by way of the embodiments herein, although the processor 22 could execute other numbers and types of programmed instructions.

The memory 24 of the chat management server apparatus 12 stores these programmed instructions for one or more aspects of this technology, as described and illustrated herein, although some or all of the programmed instructions could be stored and/or executed elsewhere. The memory 24 of the chat management server apparatus 12 may include one or more tangible storage media and/or devices, such as RAM, ROM, flash memory, hard disk drive(s), solid state memory, or any other memory storage types or devices, including combinations thereof, which are known to those of ordinary skill in the art.

In this example, the memory 24 of the chat management server apparatus 12 includes an item content catalog 30, a search web service 32, a preview web service 34, and an optional encoded token database 36, although the memory 24 can include other types and numbers of systems, devices, and elements in other configurations. Additionally, while the item content catalog 30, search web service 32, preview web service 34, and encoded token database 36 are illustrated in this example as being stored in the memory 24 of the chat management server apparatus 12, one or more of the item content catalog 30, search web service 32, preview web service 34, or encoded token database 36 could be stored elsewhere, including on another network device not shown in the network environment 10.

The item content catalog 30 in this example includes content for items, which can represent products or services, for example. The content can include a unique identifier for the item and information regarding the item including a description of the item, an item price, item options (e.g., colors), and/or any pictures or graphics associated with the item, for example, although any other type of content can also be stored in the item content catalog.

The search web service 32 in this example is configured to receive a request including search criteria and to identify matching item(s) in the item content catalog. The criteria can include search text, for example, when associated with a request to generate a search panel or a search token, for example, when associated with a request to generate a preview panel, as described and illustrated in more detail later. In response to the request, the search web service 32 retrieves at least a portion of the content (e.g., as used to present a preview of the item to a user) for each of the identified item(s) from the item content catalog 30 and generates and returns a HyperText Markup Language (HTML) fragment including the content, as described and illustrated in more detail later.

The preview web service 34 in this example is configured to receive a request to generate a preview panel that includes an item token. In response to the request, the preview web service 34 retrieves at least a portion of the content associated with an item identified based on the item token from the item content catalog 30 and generates and returns an HTML fragment including the content, as described and illustrated in more detail later.

The optional encoded token database 36 in this example stores encoded token values as associated with actual values. The actual values can be search text in the case of an encoded search token value or a unique item identifier in the case of an encoded item token value. As described and illustrated in more detail later, tokens can advantageously be encoded with this technology to facilitate the inclusion of references in a chat panel that are even shorter than search text or item identifiers, for example.

The interface device 26 in the chat management server apparatus 12 is used to operatively couple and communicate between the chat management server apparatus 12 and the client device 18 via LAN 16 and WAN 20 and the host representative device 14 via the LAN 16, although other types and numbers of communication networks or systems with other types and numbers of connections and configurations to other devices and elements can also be used. The LAN 16 and WAN 20 can use TCP/IP over Ethernet and industry-standard protocols, including NFS, CIFS, SOAP, XML, LDAP, and SNMP, for example, although other types and numbers of communication networks can also be used.

The client device 18 in this example enables a user to request, receive and interact with services and content hosted by the chat management server apparatus 12 via the LAN 16 and WAN 20, although the client device 18 could access content and utilize other types and numbers of content or applications from other sources and could provide a wide variety of other functions for a user. By way of example only, the client device 16 can be a mobile computing device, smart phone, personal digital assistant, or computer, for example.

The client device 18 includes a processor 38, a memory 40, an interface device 42, an input device 43, and a display device 44 which are coupled together by a bus 45 or other communication link, although the client device 18 can include other numbers and types of components, parts, devices, systems, and elements in other configurations. The processor 38 in the client device 18 executes a program of stored instructions for one or more aspects of the present invention as described and illustrated herein, although the processor 38 could execute other numbers and types of programmed instructions.

The memory 40 in the client device 18 stores these programmed instructions for one or more aspects of the present invention as described and illustrated herein, although some or all of the programmed instructions could be stored and/or executed elsewhere. A variety of different types of memory storage devices, such as a RAM, ROM, hard disk drive(s), solid state storage device(s), and/or other storage device which is read from and/or written to by a magnetic, optical, or other reading and/or writing system that is coupled to processor 38 can be used for the memory 40 in the client device 18. In this example, the client device 18 is configured to access web services and web content through a web browser 46 stored in the memory 40. The web browser 46 in this example is configured to process programmed instructions (e.g., JavaScript code) to render chat panels and preview panels, as well as provide other functionality, as described and illustrated in more detail later.

The interface device 42 in the client device 18 is used to operatively couple and communicate between the client device 18 and the chat management server apparatus 12 via the LAN 16 and the WAN 20, although other types and numbers of communication networks with other types and numbers of connections and configurations can be used.

The input device 43 in the client device 18 can be used to input selections, such as a request for a chat or preview panel, as well as messages to be exchanged with the user of the host representative device 14, although the input device 43 could be used to input other types of data and interact with other elements. The input device 43 can include keypads, touch screens, and/or vocal input processing systems, although other types and numbers of input devices can also be used.

The display device 44 in the client device 18 can be used to show data and information to a user, such as the requested chat or preview panel, although the display device 44 could be used to display other types of data and interact with other elements. The display device 44 can be television screen, a mobile phone screen display, a laptop screen, a tablet screen, or a monitor for example, although other types and numbers of displays could be used depending on the particular type of client device 18.

The host representative device 14 includes a processor 48, a memory 50, an interface device 52, an input device 53, and a display device 54, which are coupled together by a bus 55 or other communication link, although the host representative device 14 can include other numbers and types of components, parts, devices, systems, and elements in other configurations. The processor 48 in the host representative device 14 executes a program of stored instructions for one or more aspects of the present invention as described and illustrated herein, although the processor 48 could execute other numbers and types of programmed instructions.

The memory 50 in the host representative device 14 stores these programmed instructions for one or more aspects of the present invention as described and illustrated herein, although some or all of the programmed instructions could be stored and/or executed elsewhere. A variety of different types of memory storage devices, such as a RAM, ROM, hard disk drive(s), solid state storage device(s), and/or other storage device which is read from and/or written to by a magnetic, optical, or other reading and/or writing system that is coupled to processor 38 can be used for the memory 40 in the host representative device 14.

In this example, the host representative device 14 is operated by a representative of a host of the website associated with the item content, although the host representative device 14 could be operated by other users, in order to engage in a chat with a user of the client device 18. Accordingly, the memory 50 in this example includes a web browser 56 through which the user of the host representative device can access web services and web content. The web browser 56 in this example is configured to process programmed instructions (e.g., JavaScript code) to render chat panels, search panels, and search result panels, as well as provide other functionality, as described and illustrated in more detail later.

The interface device 52 in the host representative device 14 is used to operatively couple and communicate between the host representative device 14 and the chat management server apparatus 12 via the LAN 16, although other types and numbers of communication networks with other types and numbers of connections and configurations can be used.

The input device 53 in the host representative device 18 can be used to input selections, such as a request for a search panel, as well as messages to be exchanged with the user of the client device 18, although the input device 53 could be used to input other types of data and interact with other elements. The input device 53 can include keypads, touch screens, and/or vocal input processing systems, although other types and numbers of input devices can also be used.

The display device 54 in the host representative device 18 can be used to show data and information to a user, such as the requested search panel, although the display device 54 could be used to display other types of data and interact with other elements. The display device 54 can be television screen, a mobile phone screen display, a laptop screen, a tablet screen, or a monitor for example, although other types and numbers of displays could be used depending on the particular type of host representative device 18.

Although embodiments of the chat management server apparatus 12, host representative device 14, and client device 18 are described and illustrated herein, each of these devices can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s). Furthermore, each of the systems of the embodiments may be conveniently implemented using one or more general purpose computer systems, microprocessors, digital signal processors, and microcontrollers, programmed according to the teachings of the embodiments, as described and illustrated herein, and as will be appreciated by those ordinary skill in the art.

In addition, two or more computing systems or devices can be substituted for any one of the devices in any embodiment. Accordingly, principles and advantages of distributed processing, such as redundancy and replication also can be implemented, as desired, to increase the robustness and performance of the devices and systems of the embodiments. The embodiments may also be implemented on computer system(s) that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 2:
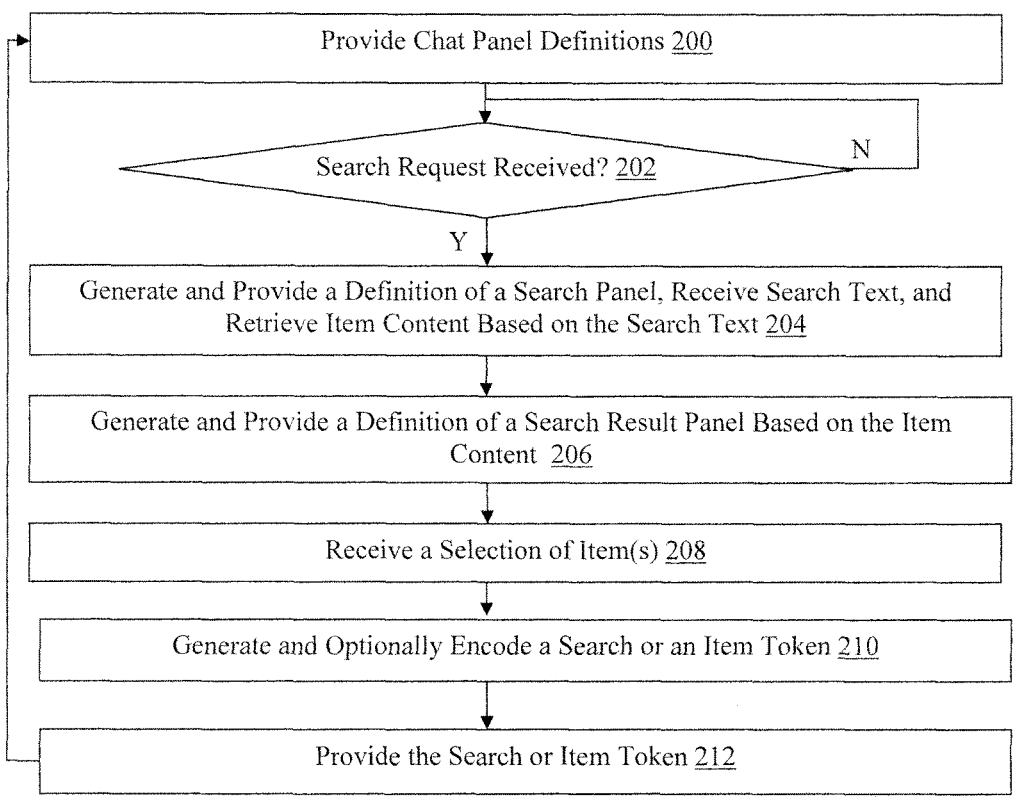
FIG. 2 is a flowchart of an exemplary method of generating an item preview panel based on a token.
Figure 3:
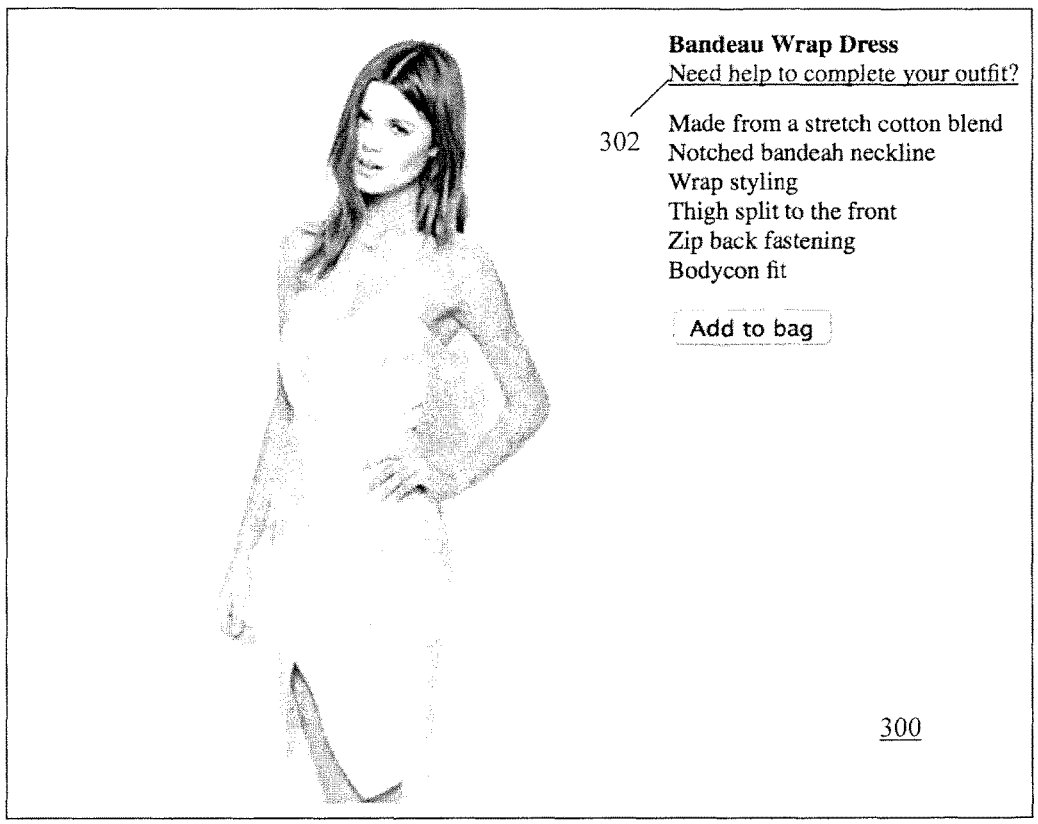
FIG. 3 is an exemplary product web page with an exemplary chat panel link.

An exemplary method for facilitating references in a chat context will now be described with reference to FIGS. 1-10. Referring specifically to FIG. 2, an exemplary method of generating a token for inclusion in a chat panel as a reference to item content will now be described. In this example, in step 200, the chat management server apparatus 12 provides chat panel definitions in response to a request received from the client device 18. Referring more specifically to FIG. 3, an exemplary product web page 300 with an exemplary chat panel link 302 is illustrated. In this example, a user of the client device 18 use the input/display device 43 to select the chat panel link 302 thereby initiating a chat session and requesting a customer chat panel from the chat management server apparatus 12, although the chat session can be initiated in other manners.

In response, the chat management server apparatus 12 sends a definition of a customer chat panel to the client device 18 and a host chat panel to the host representative device 14. The definitions can define the chat panels using HTML, for example, which, when interpreted by the web browsers 46 and 56 cause the client device 18 and host representative device 14 to display the customer and host chat panels, respectively, in a pop-up window or an overlay, for example, although any other type of display for the chat panels can also be used. The chat panels facilitate communication of messages between the users of the client device 18 and host representative device 14.

Figure 4:
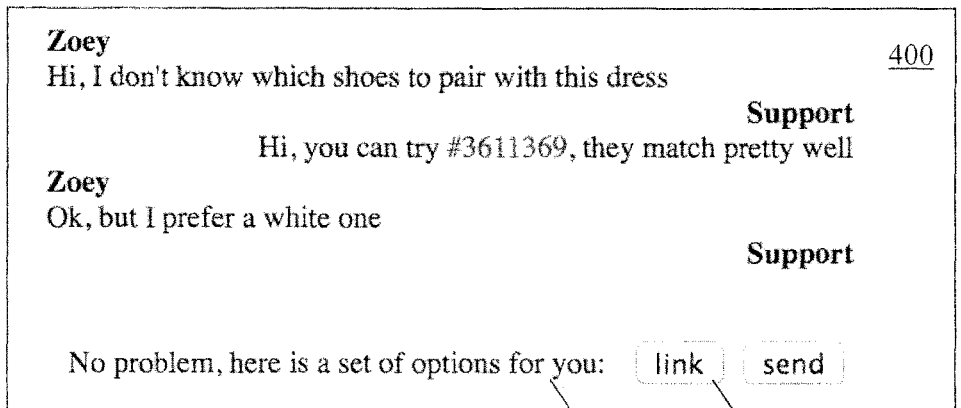
FIG. 4 is an exemplary host chat panel with a search request button.

Referring more specifically to FIG. 4, an exemplary host chat panel 400 is illustrated. In this example, a definition of the host chat panel 400 is provided by the chat management server 12 to the host representative device 14 in response to receiving an initiation of the chat session in step 200 from the client device 18. The definition sent by the chat management server 12 to the client device 18 in step 200 can define a customer chat panel similar to the host chat panel 400 but without the search request button 402, for example, although the chat panels can be similar or different in other ways and other methods of distributing and generating the chat panels can also be used. An exemplary customer chat panel will be described and illustrated in more detail later with reference to FIGS. 9-10.

In this example, the user of the client device 18 is a prospective customer of the host of the product web page 300 that is looking for assistance completing an outfit prior to purchasing, although the web page 300 can be any other type of web page and the user of the client device 18 can be any other type of user. Accordingly, the customer user of the client device 18 initiates the chat session in order to communicate with a representative of the host of the website, that is currently using the host representative device 14, to obtain the requested assistance in an efficient manner.

Referring back to FIG. 2, in step 202, the chat management server apparatus 12 determines when a search request has been received from the host representative device 14. The search request can be for content that a user of the host representative device 14 would like to refer the customer to in order to attempt to assist the customer and facilitate a purchase, for example. If the chat management server apparatus 12 determines that a search request has not been received, then the No branch is taken back to step 202 and the chat management server apparatus 12 effectively waits for a search request to be received.

Referring back to FIG. 4, the search request button 402 of the host chat panel 400 can be used to initiate a search request, although any other type of interface for initiating a search request can also be used. In this example, the customer user of the client device 18 is looking for white shoes to pair with a specified dress. Accordingly, the host representative using the input/display device 53 of the host representative device 14 begins to type a message in an input field 404, having the text "No problem, here is a set of options for you:" in this example. Next, the host representative using the input/display device 53 of the host representative device 14 selects the search request button 402 in order to initiate a search for items responsive to the customer's request.

Referring back to step 202 of FIG. 2, upon selection of the search request button 402, or if the chat management server apparatus 12 otherwise determines that a search request has been received, then the Yes branch is taken to step 204. In step 204, the chat management server apparatus 12 generates, and provides to the host representative device 14, a definition of a search panel, receives search text, and retrieves item content based on the search text. The definition can define a search panel using HTML, for example, which, when interpreted by the web browser 56 can cause the host representative device 14 to display a search panel in a pop-up window or an overlay, for example, although the search panel can be displayed in other manners. The search panel is configured to receive search text, and optionally other search criteria, from the host representative using the host representative device 14.

Figure 5:
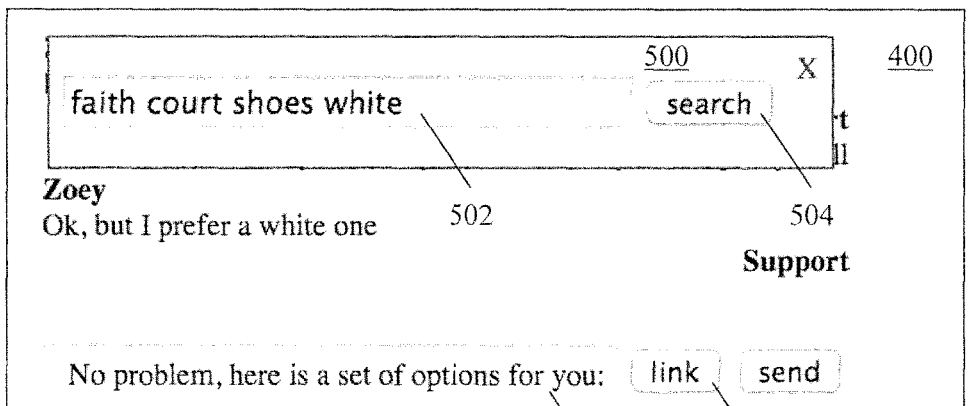
FIG. 5 is an exemplary search panel for receiving search text.

Referring more specifically to FIG. 5, an exemplary search panel 500 for receiving search text via a text input box 502 is illustrated, although in other examples the search panel 500 can include inputs for other search criteria. In this example, the search text "faith court shoes white" is input by the host representative using the input/display device 53 of the host representative device 14. Upon selection of a search button 504 by the host representative, the search criteria are sent to the chat management server apparatus 12. In this example, the search criteria, including the search text, is sent to the search web service 32 of the chat management server apparatus 12, which is configured to process the criteria as described and illustrated in more detail later. Other methods of receiving search criteria can also be used.

In response to receiving the search text, the search web service 32 of the chat management server apparatus 12 identifies and retrieves item content responsive to the request in step 204. The item content can be retrieved from the item content catalog 30, which in this example includes content associated with a plurality of items for sale by the website host, although any other type of content associated with any other type of item can also be used. The content can include an item description, an item depiction, an item price, or any other information associated with each of the items. Optionally, the content includes at least information suitable to provide the customer with a preview of the item to allow the customer to decide whether to learn more about the item in order to make a purchasing decision.

In step 206, the search web service 32 of the chat management server apparatus 12 generates and provides to the host representative device 14 a definition of a search result panel based on the item content retrieved in step 204. In this example, the item content can include a picture, a short description, and a price of various white faith court shoes identified based on the search text. Accordingly, the definition includes one or more HTML fragments for the identified item(s) that includes the content and is configured to generate a search result panel including the content when rendered by the web browser 56 of the host representative device 14.

Figure 6:
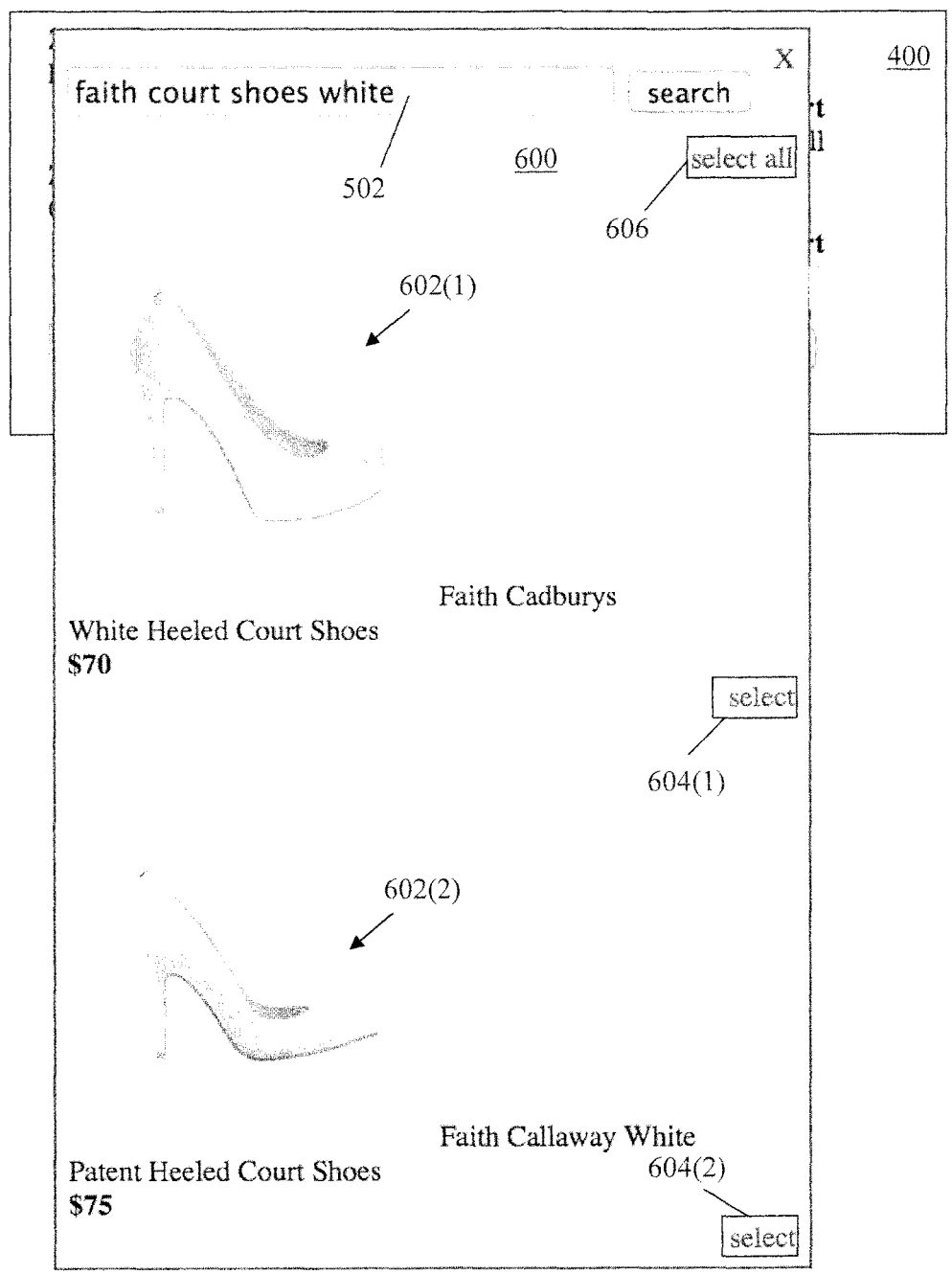
FIG. 6 is an exemplary search result panel displaying content for a plurality of selectable items identified based on search text.

Referring more specifically to FIG. 6, an exemplary search result panel 600 displaying content for a plurality of selectable items identified based on the search text is illustrated. In this example, the search result panel 600 includes item content 602(1) and 601(2) for two items ("white heeled court shoes" and "patent heeled court shoes") satisfying the search criteria received in step 204. Any number of items can be identified and included in the search result panel 600 and the search results can be displayed by the web browser 56 of the host representative device 14 in other manners.

Referring back to FIG. 2, in step 208, the chat management server 12 receives a selection from the host representative using the host representative device 14 of one or more of the item(s) for which content 602(1) and 601(2) was identified and retrieved in step 204, and provided to the host representative device 14 in step 206. The selected item(s) are those item(s) responsive to the customer's request and for which the host representative would like to specifically refer the customer to in order to assist the customer in making a purchasing decision in this example.

Referring back to FIG. 6, in this example, the content 602(1) and 602(2) for each item is associated with a select button 604(1) and 604(2), respectively. Additionally, the search result panel 600 includes a select all button 606. Upon selection of one of the buttons 604(1), 604(2), or 606 by the host representative using the input/display device 53 of the host representative device 14, an indication of the selection is sent to the chat management server apparatus 12. Accordingly, the definition of the search result panel 600 sent to the host representative device 14 in step 206 of FIG. 2 is configured to facilitate the selection of items, although other methods of facilitating the selection of item(s) can also be used.

In step 210, the chat management server apparatus 12 generates, and optionally encodes, a search or an item token. In this example, the tokens are prefixed by a first special character (e.g., "@") or a second special character (e.g., "#") according to whether the token is a search token or an item token, respectively, although the first or second special character can be included in the tokens in any location. The token is a search token if all of the items for which content is displayed in the search panel 600 are selected by the host representative using the host representative device 14 (e.g., by selecting the select all button 606). Additionally, the token is an item token if fewer than all of the items or which content is displayed in the search panel 600 are selected (e.g., using one or more of the select buttons 604(1) or 604(2)).

In this example, if the host representative using the host representative device 14 selects the select all button 606, an exemplary token including the first special character and the search text could be "@faith_court_shoes_white". By including the search text, the host representative can advantageously reuse this token in subsequent chat sessions as it will be relatively easy to remember. For example, the host representative can reuse the token with other prospective customers the host representative would like to refer to the same content, as described and illustrated in more detail later.

In another example, as described and illustrated in more detail later with reference to FIG. 10, if the host representative using the host representative device 14 selected only one of the items for which content was displayed on the search panel 600, an exemplary token including the second special character and a unique item identifier could be '#3611369". Accordingly, in this example, the "3611369" portion of the token corresponds to a unique identifier for the one selected item, as stored as associated with the content for the item in the content catalog 30.

However, in yet another example, the chat management server apparatus 12 can encode the token in order to reduce the size instead of merely using the search text or the unique item identifier for the portion of the token not including the special character. Accordingly, the chat management server apparatus 12 can decide to encode the token based on whether the number of characters in the search text or unique item identifier exceeds a threshold, for example, although the decision of whether to encode a token can be based on any other criteria. Additionally, the chat management server apparatus 12 can be configured to encode all or none of the tokens as a default setting.

If the chat management server apparatus 12 determines in step 210 that the search token in this example should be encoded, an exemplary encoded search token could be "@42ad42", although any other encoding can be used. The chat management server apparatus 12 can replace the "faith_court_shoes_white" search text in the token by encoding the search text to generate an output of "42ad42". Any type of encoding function or formula can be used. Optionally, the output of the encoding can be limited to a certain number of characters in order to optimize the benefit of using an encoded token in place of a token including search text or an item identifier. Additionally, if the chat management server apparatus 12 determines in step 210 that the token should be encoded, then the chat management server apparatus 12 in this example stores at least the encoded portion of the search token as associated with the search criteria (e.g., the search text) in the encoded token database 36 so that the encoded token can subsequently be decoded, as described and illustrated in more detail later with reference to step 804 of FIG. 8.

Figure 7:
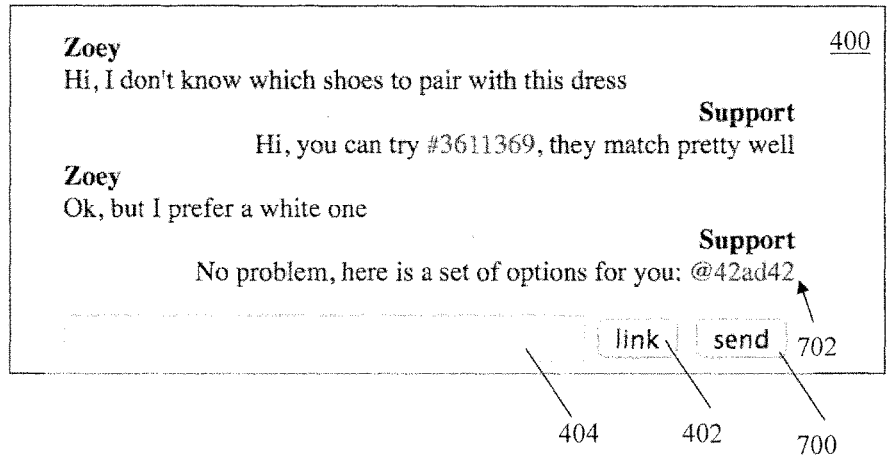
FIG. 7 is the exemplary chat panel of FIG. 4 with an item set link corresponding to a search token.

Referring back to FIG. 2, in step 212, the chat management server apparatus 12 provides the search or item token to the host representative device 14. Referring more specifically to FIG. 7, the exemplary host chat panel 400 is illustrated with an item set link 702 corresponding to the search token "@42ad42", which is an encoded search token in this example. Accordingly, upon receipt by the host representative device 14 of the search token, the host chat panel 400 inserts the search token text into the input field 404.

Upon the host representative selecting the send button 700, using the input/display device 53 of the host representative device 14, the input text including the search token is sent to the chat management server 14, which routes the text to the customer chat panel currently rendered on the client device 18 using an established connection. Upon display of the input text in the host chat panel 400, as well as the customer chat panel currently rendered on the client device 18, the search token becomes the item set link 702.

Accordingly, the definition of the chat panel 400 sent to the host representative device 14 is configured to insert a token returned in step 212 into the input field 404 and render the token as a hyperlink (the item set link 702 in this example) used as described and illustrated in more detail with reference to FIG. 8. Optionally, at least the customer chat panel is configured, based on its definition, to render any text sent from a host representative in a chat session that includes the first or second special character as an item set link or an item link, respectively.

Figure 8:
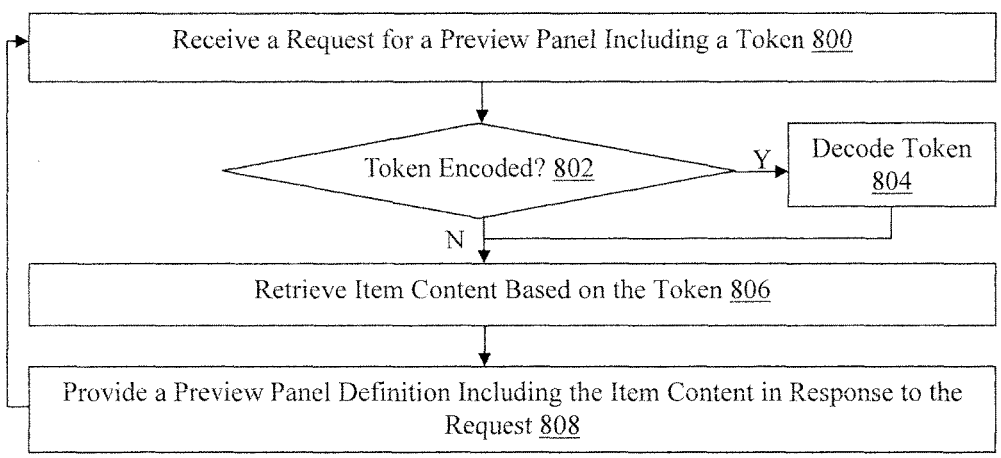
FIG. 8 is a flowchart of an exemplary method of generating a token for inclusion in a customer chat panel as a reference to item content.

Referring more specifically to FIG. 8, an exemplary method of generating an item preview panel based on a token will now be described. In step 800 in this example, the chat management server apparatus 12 receives a request from the client device 18 for a preview panel. The request includes a token and is sent in response to a selection by the customer, using the input/display device 43 of the client device 18, of a hyperlink including the token that was rendered in the customer chat panel. The hyperlink can be rendered in the customer chat panel subsequent to the host representative submitting a message including the token. The token can be manually entered by the host representative or provided by the chat management server apparatus 12, as described and illustrated earlier with reference to step 212.

In step 802, the chat management server apparatus 12 determines when the token included in the request for the preview panel received in step 800 is encoded. In order to determine whether the token is decoded, the chat management server apparatus 12 can compare the token to entries of the encoded token database 36 to determine where there is a match in this example, although other methods of determining whether the token is encoded can also be used. If the chat management server apparatus 12 determines that the token is encoded, then the Yes branch is taken to step 804.

In step 804, the chat management server apparatus 12 decodes the token. In order to decode the token in this example, the chat management server apparatus 12 retrieves the actual value of the portion of the token not including the special character from the matching entry of the encoded token database 36. The actual value could have been stored in the encoded token database 36 as described and illustrated in more detail earlier with reference to step 210 of FIG. 2. Accordingly, in this example, the chat management server 12 can obtain the "faith_court_shoes_white" actual value by decoding the "42ad42" encoded token value. Other methods of encoding or decoding the tokens, including using a reversible encoding function that does not require a database look-up, can also be used. Subsequent to decoding the token, or if the chat management server apparatus 12 determines in step 802 that the token is not encoded and the No branch is taken, the chat management server apparatus 12 proceeds to step 806.

In step 806, the chat management server apparatus 12 retrieves item content based on the token. In order to retrieve the item content, in this example, the chat management server apparatus 12 first determines whether the token is a search or an item token based on whether the token includes the first or second special character. If the chat management server apparatus 12 determines that the token is a search token, then the portion of the token not including the first special character, or the decoded actual value in examples in which step 804 is performed, is processed by the search web service 32. Accordingly, the search web service 32 searches the item content catalog 30, as described and illustrated earlier with reference to step 206 of FIG. 2, using the token value as the search text in order to identify and retrieve responsive item content.

However, if the chat management server apparatus 12 determines that the token is an item token, then the portion of the token not including the first special character, or the decoded actual value in examples in which step 804 is performed, is processed by the preview web service 34. Accordingly, the preview web service 34 searches the item content catalog 30 using the token value to identify and retrieve content for an item having a unique item identifier matching the token value.

In step 808, the chat management server apparatus 12 provides a preview panel definition, including HTML fragment(s) including the content retrieved in step 806, to the client device 18 in response to the request for the preview panel received in step 800. The preview panel definition is configured to, when rendered, cause the web browser 46 of the client device 18 to generate a preview panel that includes the item content. The preview panel can be generated a pop-up window, an overlay, or any other type of display that does not require navigation by the web browser 46 away from the customer chat panel. Additionally, the preview panel can be a multi-item preview panel with a navigation structure or a single item preview panel based on whether the token, received with the request for the preview panel in step 800, is a search token or an item token, respectively.

Optionally, at least a portion of the content displayed by the preview panel is, or another portion of the preview panel includes, a link that is selectable by the customer using the client device 18 in order to allow the customer to navigate to a different web page associated with the item that provides additional content. Also optionally, at least a portion of the content displayed by the preview panel is, or another portion of the preview panel includes, a link that is selectable by the customer using the client device 18 in order to allow the customer to navigate to an item purchase web page or add the item to a shopping cart, for example. Other types of links and other content can also be provided in the preview panel.

Figure 9:
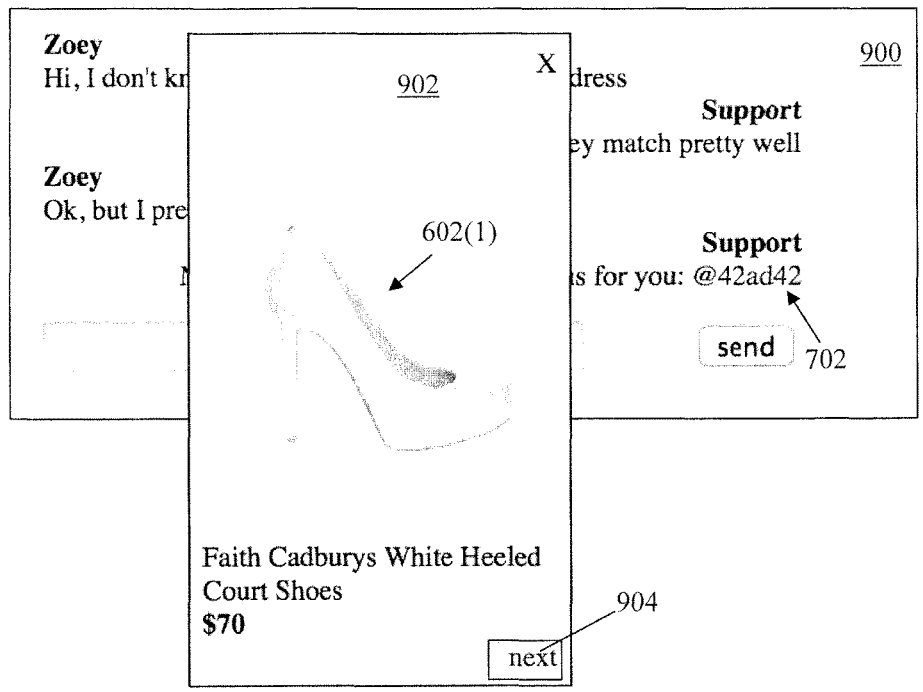
FIG. 9 is an exemplary customer chat panel with the item set link and an exemplary multi-item preview panel with a navigational structure.

Referring more specifically to FIG. 9, an exemplary customer chat panel 900 with the item set link 702 corresponding to the encoded search token "@42ad42" and an exemplary multi-item preview panel 902 are illustrated. In this example, the multi-item preview panel 902 is generated, based on the definition provided in step 808, subsequent to the customer selecting the item set link 702 using the input/display device of the client device 18. The multi-item preview panel 902 includes the content 602(1) for one of the items that the host representative selected to be referred to the customer in this example.

Additionally, the multi-item preview panel 902 includes a navigation structure, which in this example includes a next button 904, which facilitates navigation between content associated with a plurality of items, including at least the content 602(2) of another of the items that the host representative selected to be referred to the customer in this example. Other types of navigational structures can also be used.

Figure 10:
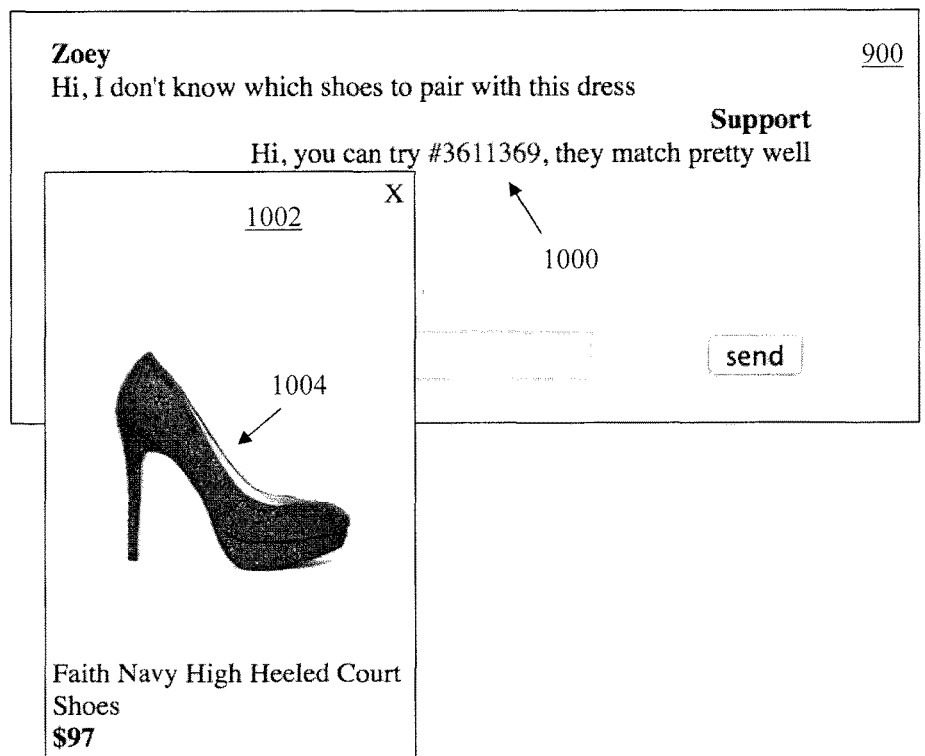
FIG. 10 is the exemplary chat panel of FIG. 9 with an item link and an exemplary single item preview panel.

Referring more specifically to FIG. 10, the exemplary customer chat panel 900 of FIG. 9 with an item link 1000 and an exemplary single item preview panel 1002 are illustrated. In this example, the item link 1000 corresponds to an item token "·3611369" which includes a unique item identifier "3611369" for a single item selected by the host representative in an iteration of steps 202-212 of FIG. 2 performed prior to the example iteration described and illustrated in detail earlier. The item preview panel 1002 includes content 1004 for a navy colored shoe item that the customer in this example is not interested in. Instead, the customer indicated to the host representative a preference for a white shoe and the host representative submitted the request received in step 202 in the example iteration described and illustrated earlier in order to identify items responsive to the customer's preference.

Accordingly, with this technology, representatives of website hosts can more easily and effectively refer website users to preview content for items in a chat context. The references can be sent using tokens which are generally, or can be encoded to be, shorter than URLs associated with web pages corresponding to the items. Additionally, host representatives can refer users to preview content for item(s) by reusing tokens thereby facilitating relatively quick responsiveness. Moreover, items identified by a host representative can advantageously be displayed by a user in a preview panel without requiring the user to navigate away from the chat panel or the current web page and thereby significantly improving the functioning of the user's client device.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for facilitating references in a chat context, the method comprising:
   receiving, by a chat management server apparatus, a search request via a search panel provided in response to a user interaction with a chat panel;
   generating, by the chat management server apparatus, a token encoded with a special character, wherein the token is generated based on a search text in the search request;
   providing, by the chat management server apparatus, the token to a source of the search request for inclusion in the chat panel as a hyperlink;
   receiving, by the chat management server apparatus, an interactive preview panel request for an interactive preview panel comprising one or more webpage links in response to a user interaction with the hyperlink, the interactive preview panel request including the token with the encoded special character;
   determining, by the chat management server apparatus, when the token included in the interactive preview panel request is one of a plurality of a types of token based on decoding the encoded special character included in the token;
   retrieving, by the chat management server apparatus, content for one or more items associated with the determined one of the plurality of the types of token; and
   providing, by the chat management server apparatus, the content to a source of the interactive preview panel request.

2. The method as set forth in claim 1, further comprising, prior to generating the token:
   retrieving, by the chat management server apparatus, the content for the items based on the search text;
   providing, by the chat management server apparatus, the content for the items to the source of the search request for inclusion in a search result panel;
   receiving, by the chat management server apparatus, a selection of one or more of the items from the source of the search request;
   determining, by the chat management server apparatus, that the token included in the interactive preview panel request is a search token based on a first special character included in the token; and
   determining, by the chat management server apparatus, that the token included in the interactive preview panel request is an item token based on a second special character included in the token, wherein the second special character is different from the first special character.

3. The method as set forth in claim 2, wherein the selection is of all of the items and the generating further comprises generating the search token comprising a first special character and the request for the interactive preview panel includes the search token.

4. The method as set forth in claim 2, wherein the selection is of one or more of the items, the generating further comprises generating the item token for each of the one or more items, each item token comprises a second special character, and the request for the interactive preview panel includes at least one of the item tokens.

5. The method as set forth in claim 3, wherein the search token includes at least one or more terms included in the search text.

6. The method as set forth in claim 1, wherein:
   the generating further comprises generating the token based on a unique identifier for one of a plurality of items, wherein the plurality of items are identified based on a search performed using the search text and encoding the search text or the unique identifier and storing the encoded search text or the encoded unique identifier in an encoded token database as associated with the corresponding search text or unique identifier, wherein the token is generated based on the encoded search text or the encoded unique identifier; and
   the retrieving further comprises decoding the token comprising comparing the token to the encoded token database to retrieve the search text or unique identifier.

7. The method as set forth in claim 6, wherein the retrieving further comprises:
   determining when the token included in the interactive preview panel request is a search token based on a match of a specified character of the token with a first special character;
   performing a search of an item content catalog using the search text, as determined based on the token included in the interactive preview panel request, to retrieve the content for the items, when the token included in the interactive preview panel request is determined to be the search token; and
   retrieving content for the one item based on the unique identifier, as determined based on the token included in the interactive preview panel request, when the token included in the interactive preview panel request is not determined to be the search token.

8. A non-transitory computer readable medium having stored thereon instructions for facilitating references in a chat context comprising executable code which when executed by a processor, causes the processor to perform steps comprising:
    receiving a search request via a search panel provided in response to a user interaction with a chat panel;
    generating a token encoded with a special character, wherein the token is generated based on a search text in the search request;
    providing the token to a source of the search request for inclusion in the chat panel as a hyperlink;
    receiving an interactive preview panel request for an interactive preview panel comprising one or more webpage links in response to a user interaction with the hyperlink, the interactive preview panel request including the token with the encoded special character;
    determining when the token included in the interactive preview panel request is one of a plurality of a types of token based on decoding the encoded special character included in the token;
    retrieving content for one or more items associated with the determined one of the plurality of the types of token; and
    providing the content to a source of the interactive preview panel request.

9. The non-transitory computer readable medium as set forth in claim 8, further having stored thereon instructions that when executed by the processor cause the processor to perform steps further comprising, prior to generating the token:
    retrieving the content for the items based on the search text;
    providing the content for the items to the source of the search request for inclusion in a search result panel;
    receiving a selection of one or more of the items from the source of the search request;
    determining that the token included in the interactive preview panel request is a search token based on a first special character included in the token; and
    determining, by the chat management server apparatus, that the token included in the interactive preview panel request is an item token based on a second special character included in the token, wherein the second special character is different from the first special character.

10. The non-transitory computer readable medium as set forth in claim 9, wherein the selection is of all of the items and the generating further comprises generating the search token comprising a first special character and the request for the interactive preview panel includes the search token.

11. The non-transitory computer readable medium as set forth in claim 9, wherein the selection is of one or more of the items, the generating further comprises generating the item token for each of the one or more items, each item token comprises a second special character, and the request for the interactive preview panel includes at least one of the item tokens.

12. The non-transitory computer readable medium as set forth in claim 10, wherein the search token includes at least one or more terms included in the search text.

13. The non-transitory computer readable medium as set forth in claim 8, wherein:
    the generating further comprises generating the token based on a unique identifier for one of a plurality of items, wherein the plurality of items are identified based on a search performed using the search text and encoding the search text or the unique identifier and storing the encoded search text or the encoded unique identifier in an encoded token database as associated with the corresponding search text or unique identifier, wherein the token is generated based on the encoded search text or the encoded unique identifier; and
    the retrieving further comprises decoding the token comprising comparing the token to the encoded token database to retrieve the search text or unique identifier.

14. The non-transitory computer readable medium as set forth in claim 13, wherein the retrieving further comprises:
    determining when the token included in the interactive preview panel request is a search token based on a match of a specified character of the token with a first special character;
    performing a search of an item content catalog using the search text, as determined based on the token included in the interactive preview panel request, to retrieve the content for the items, when the token included in the interactive preview panel request is determined to be the search token; and
    retrieving content for the one item based on the unique identifier, as determined based on the token included in the interactive preview panel request, when the token included in the interactive preview panel request is not determined to be the search token.

15. A chat management server apparatus, comprising a processor and a memory coupled to the processor which is configured to be capable of executing programmed instructions comprising and stored in the memory to:
    receive a search request via a search panel provided in response to a user interaction with a chat panel;
    generate a token encoded with a special character, wherein the token is generated based on a search text in the search request;
    provide the token to a source of the search request for inclusion in the chat panel as a hyperlink;
    receive an interactive preview panel request for an interactive preview panel comprising one or more webpage links in response to a user interaction with the hyperlink, the interactive preview panel request including the token with the encoded special character;
    determine when the token included in the interactive preview panel request is one of a plurality of a types of token based on decoding the encoded special character included in the token;
    retrieve content for one or more items associated with the determined one of the plurality of the types of token; and
    provide the content to a source of the interactive preview panel request.

16. The chat management server apparatus as set forth in claim 15, wherein the processor coupled to the memory is further configured to be capable of executing programmed instructions further comprising and stored in the memory to, prior to generating the token:
    retrieve the content for the items based on the search text;
    provide the content for the items to the source of the search request for inclusion in a search result panel;
    receive a selection of one or more of the items from the source of the search request;
    determining, by the chat management server apparatus, that the token included in the interactive preview panel request is a search token based on a first special character included in the token; and determining, by the chat management server apparatus, that the token included in the interactive preview panel request is an item token based on a second special character included in the token, wherein the second special character is different from the first special character.

17. The chat management server apparatus as set forth in claim 16, wherein the selection is of all of the items, the processor coupled to the memory is further configured to be capable of executing at least one additional programmed instruction further comprising and stored in the memory to generate the search token comprising a first special character, and the request for the interactive preview panel includes the search token.

18. The chat management server apparatus as set forth in claim 16, wherein the selection is of one or more of the items, the processor coupled to the memory is further configured to be capable of executing at least one additional programmed instruction further comprising and stored in the memory to generate the item token for each of the one or more items, each item token comprises a second special character, and the request for the interactive preview panel includes at least one of the item tokens.

19. The chat management server apparatus as set forth in claim 17, wherein the search token includes at least one or more terms included in the search text.

20. The chat management server apparatus as set forth in claim 15, wherein the processor coupled to the memory is further configured to be capable of executing programmed instructions further comprising and stored in the memory to:

generate the token based on a unique identifier for one of a plurality of items, wherein the plurality of items are identified based on a search performed using the search text;

encode the search text or the unique identifier and storing the encoded search text or the encoded unique identifier in an encoded token database as associated with the corresponding search text or unique identifier, wherein the token is generated based on the encoded search text or the encoded unique identifier; and decode the token comprising comparing the token to the encoded token database to retrieve the search text or unique identifier.

21. The chat management server apparatus as set forth in claim 20, wherein the processor coupled to the memory is further configured to be capable of executing programmed instructions further comprising and stored in the memory to:

determine when the token included in the interactive preview panel request is a search token based on a match of a specified character of the token with a first special character;

perform a search of an item content catalog using the search text, as determined based on the token included in the interactive preview panel request, to retrieve the content for the items, when the token included in the interactive preview panel request is determined to be the search token; and retrieve content for the one item based on the unique identifier, as determined based on the token included in the interactive preview panel request, when the token included in the interactive preview panel request is not determined to be the search token.

* * * * *